US008488177B2

(12) United States Patent
Yamada

(10) Patent No.: US 8,488,177 B2
(45) Date of Patent: Jul. 16, 2013

(54) IMAGE FORMING APPARATUS, IMAGE FORMING APPARATUS CONTROLLER AND IMAGE FORMING SYSTEM

(75) Inventor: Akihiro Yamada, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 1691 days.

(21) Appl. No.: 11/585,193

(22) Filed: Oct. 24, 2006

(65) Prior Publication Data

US 2007/0091353 A1   Apr. 26, 2007

(30) Foreign Application Priority Data

Oct. 25, 2005   (JP) .................................. 2005-310174

(51) Int. Cl.
*G06K 15/00* (2006.01)
(52) U.S. Cl.
USPC ........................................................ 358/1.16
(58) Field of Classification Search
USPC ................................ 358/1.15, 1.13, 1.12, 1.1
See application file for complete search history.

(56) References Cited

U.S. PATENT DOCUMENTS

| 6,006,045 | A | 12/1999 | Miyawaki |
| 6,202,092 | B1 | 3/2001 | Takimoto |
| 2001/0002958 | A1* | 6/2001 | Ito ................................... 400/62 |
| 2003/0182368 | A1 | 9/2003 | Horiyama |
| 2004/0130743 | A1 | 7/2004 | Nozato |
| 2005/0055547 | A1 | 3/2005 | Kawamura |

FOREIGN PATENT DOCUMENTS

| JP | A 8-25757 | 1/1996 |
| JP | A 9-190117 | 7/1997 |
| JP | A 10-161823 | 6/1998 |
| JP | A 10-268712 | 10/1998 |
| JP | A-11-146110 | 5/1999 |
| JP | A 11-174920 | 7/1999 |
| JP | A-2001-195218 | 7/2001 |
| JP | A 2002-103753 | 4/2002 |
| JP | A 2002-196918 | 7/2002 |
| JP | A 2003-67174 | 3/2003 |
| JP | A 2003-280879 | 10/2003 |
| JP | A-2003-308187 | 10/2003 |
| JP | A-2004-112439 | 4/2004 |
| JP | A 2004-178249 | 6/2004 |
| JP | A-2004-234326 | 8/2004 |
| JP | A 2004-309919 | 11/2004 |

(Continued)

OTHER PUBLICATIONS

Japanese Office Action issued in Japanese Patent Application No. 2005-310174 on Dec. 3, 2009 (with English-language translation).

*Primary Examiner* — Jeremiah Bryar
(74) *Attorney, Agent, or Firm* — Oliff & Berridge, PLC

(57) ABSTRACT

An image forming apparatus, which is connected to an image forming apparatus controller via a network and is capable of performing image forming in response to an image forming request received from the image forming apparatus controller. The image forming apparatus includes a storage unit that stores limitation information, which defines an image forming limitation, in association with the image forming apparatus controller, a determination unit that, when inquiry information concerning limitation is received from the image forming apparatus controller, employs the limitation information to determine whether the image forming limitation for the image forming apparatus controller has been applied, and a limitation information output unit that, when the determination unit determines that the limitation for the image forming apparatus controller has been applied, outputs to the image forming apparatus controller usage limitation information in order to limit usage of the image forming apparatus.

6 Claims, 13 Drawing Sheets

FOREIGN PATENT DOCUMENTS

| | | |
|---|---|---|
| JP | A 2004-341809 | 12/2004 |
| JP | A-2005-31784 | 2/2005 |
| JP | A-2005-85090 | 3/2005 |
| JP | A 2005-193560 | 7/2005 |

* cited by examiner

PRINT INFORMATION DB

| USER ID | PRINT COUNT | LIMITATION OF PRINT COUNT |
|---------|-------------|---------------------------|
| ID 1    | 7           | 100                       |
| ID 2    | 60          | 100                       |
| ...     |             |                           |
| ID 10   | 48          | 50                        |

| MAXIMUM AVAILABLE NUMBER TO BE DESIGNATED FOR EACH USER | 500 |
|---|---|

IMAGE FORMING APPARATUS, IMAGE FORMING APPARATUS CONTROLLER AND IMAGE FORMING SYSTEM

CROSS REFERENCE TO RELATED APPLICATION

This application claims priority from Japanese Patent Application No. 2005-310174, filed on Oct. 25, 2005, the entire subject matter of which is incorporated herein by reference.

TECHNICAL FIELD

Aspects of the present invention relate to an image forming apparatus, an image forming apparatus controller and an image forming system.

BACKGROUND

Conventionally, an image forming apparatus is known which is connected to a computer via a network and performs printing based on printing requests processed by the computer.

Management of this type of image forming apparatus is provided by the computer, which serves as an image forming apparatus controller that performs a check, upon the entry by a user of a printing (image forming) request, to determine whether the user is authorized to use the image forming apparatus. In the event the user is so authorized, the computer then transmits the printing request to the image forming apparatus for execution.

Specifically, as disclosed in JP-A-10-161823, user authorization for employing an image forming apparatus is recorded in a database that is stored in a server computer.

Thus, when a client computer transmits a printing request from a user to the server computer, the server computer examines the database to determine whether the user has been authorized to employ the image forming apparatus. Only if the user has been authorized to employ the image forming apparatus, the server computer accepts the request from the client computer and permits the printing.

SUMMARY

According to such a configuration, when a user for whom printing employing a specific image forming apparatus is not authorized still desires to print a document, the user must designate another image forming apparatus, one other than the one for which printing was not permitted, by issuing a new printing request. Thus, to perform the printing, extra labor is required.

Aspects of the present invention provide an image forming apparatus that can reduce the labor required during image forming processing, an image forming apparatus controller and an image forming system.

According to an aspect of the invention, there is provided an image forming apparatus, which is connected to an image forming apparatus controller via a network and is capable of performing image forming in response to an image forming request received from the image forming apparatus controller, comprising: a storage unit that stores limitation information, which defines an image forming limitation, in association with the image forming apparatus controller; a determination unit that, when inquiry information concerning limitation is received from the image forming apparatus controller, employs the limitation information to determine whether the image forming limitation for the image forming apparatus controller has been applied; and a limitation information output unit that, when the determination unit determines that the limitation for the image forming apparatus controller has been applied, outputs to the image forming apparatus controller usage limitation information in order to limit usage of the image forming apparatus.

BRIEF DESCRIPTION OF THE DRAWINGS

FIG. 9 is a flowchart showing processing performed by a CPU when the personal computer is powered on;

FIG. 11 is a flowchart showing processing performed by the CPU after the multifunction apparatus is powered on;

DETAILED DESCRIPTION

One aspect of the present invention will now be described with reference to FIGS. 1 to 14.

1. Configuration of this Aspect

Figure 1:
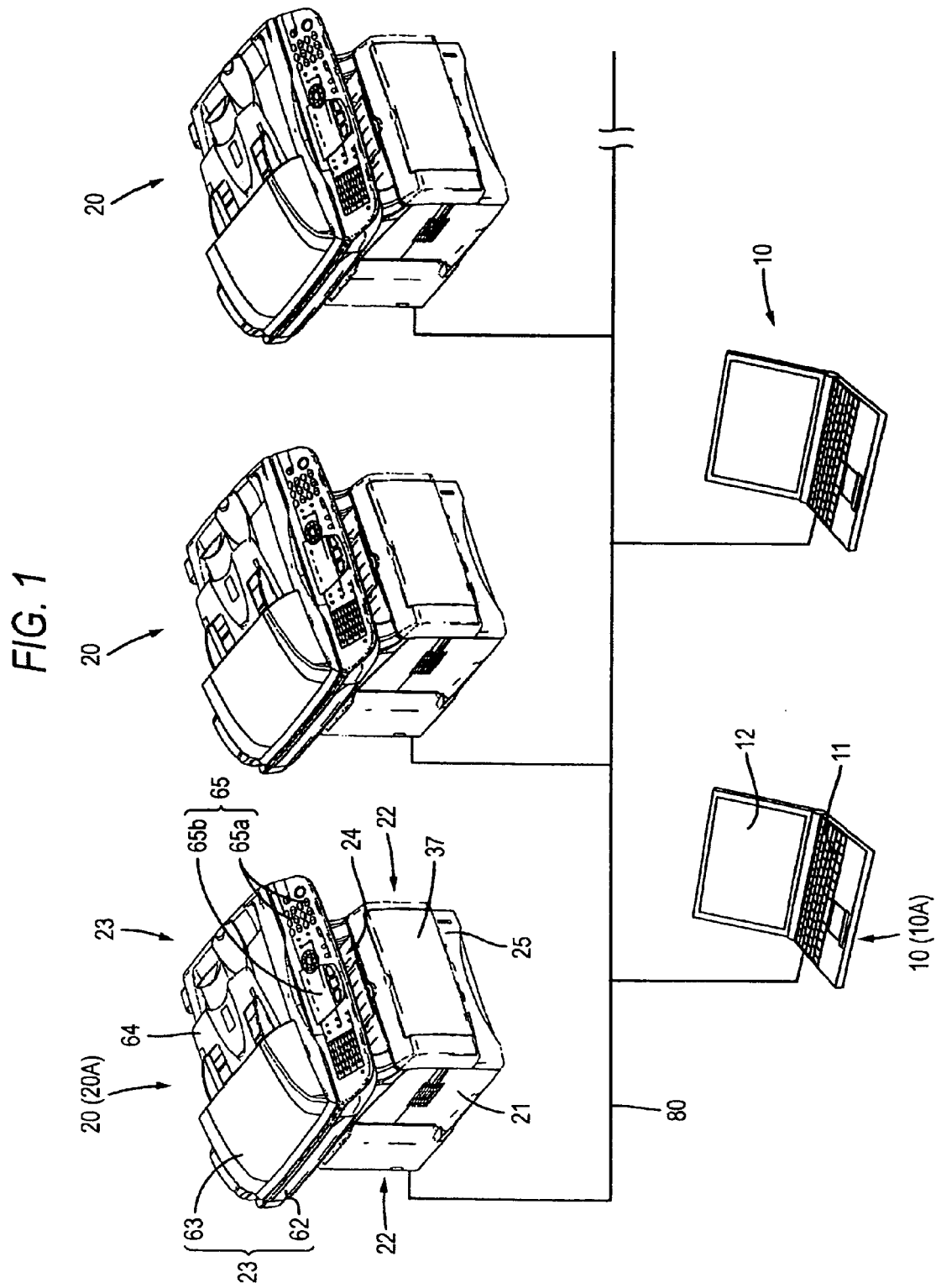
FIG. 1 is a schematic perspective view of a configuration of personal computers and multifunction apparatuses in an image forming system according to one aspect of the present invention.

FIG. 1 is a perspective view of the schematic configuration of personal computers and multifunction apparatuses in an image forming system 1.

In the image forming system 1, a plurality (two in FIG. 1) of personal computers (each corresponding to "image forming apparatus controller"; hereinafter referred to as "PCs") 10 and a plurality (three in FIG. 1) of multifunction apparatuses (each corresponding to "image forming apparatus") 20 are connected via a communication line (network) 80. In the image forming system 1, one of the PCs 10 issues a printing instruction (image forming request) to a multifunction apparatus 20 selected by a user, and the multifunction apparatus 20 initiates the printing (image forming) processing.

(1) Multifunction Apparatus (a) Arrangement

Figure 3:
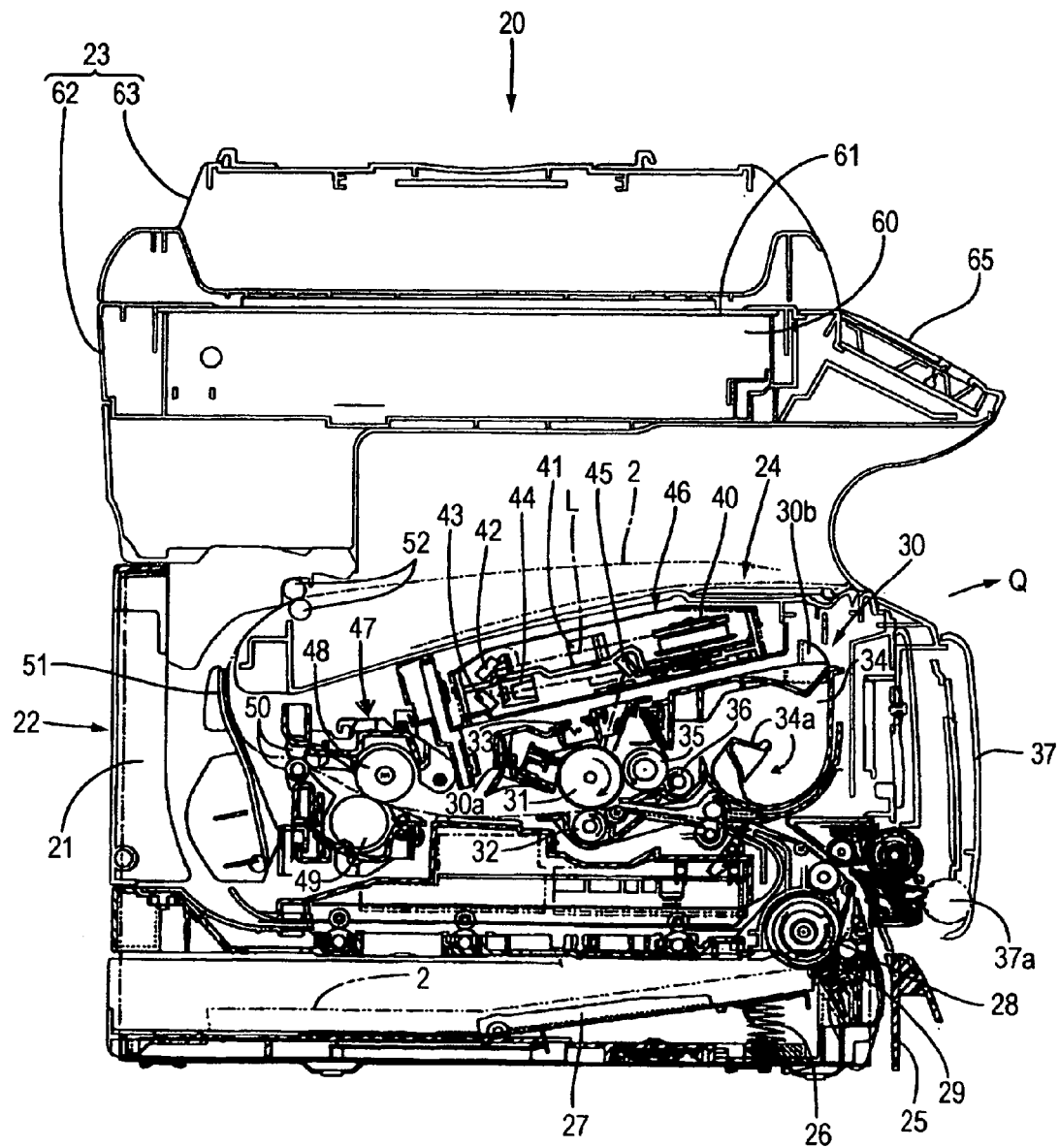
FIG. 3 is a side cross-sectional view of an internal arrangement of the multifunction apparatus.

FIG. 3 is a side cross-sectional view of the internal arrangement of the multifunction apparatus 20. In the following description, the right side on the sheet in FIG. 3 (the obliquely lower right side on the sheet in FIG. 1) is regarded as a "front face". Since the same arrangement is employed for all the multifunction apparatuses 20, only one of the multifunction apparatuses 20 (20A) will be described.

The multifunction apparatus has an image forming unit 22 and an image reading unit 23. The multifunction apparatus 20 includes a facsimile function, a scanner function and a printer function. Further, the multifunction apparatus 20 is an inner discharge type wherein a sheet discharge tray 24 is located between the two units 22 and 23.

A sheet cassette 25 in which sheets 2 (recording media) are stacked and stored is attached below a casing 21 of the image forming unit 22. The sheet cassette 25 is detachable and can be removed by pulling it forward toward the front face of the multifunction apparatus 20. As shown in FIG. 3, a sheet pressing plate 27, which is urged upward by a pressure spring 26, is provided in the sheet cassette 25, so that the topmost sheet 2 in the sheet cassette 25 contacts a feed roller 28. Through a separation pad 29, the sheets 2 are separated, and each sheet is fed individually.

A process cartridge 30 is arranged above the sheet cassette 25. The process cartridge 30, as well as the sheet cassette 25, is detachable. For maintenance such as the exchange of toner, the process cartridge 30 can be removed in the direction indicated by an arrow Q. The process cartridge 30 is configured by: a photosensitive member cartridge 30a that includes a photosensitive drum 31 for transferring a toner image; a transfer roller 32 for transferring to the sheet 2 the toner image carried by the photosensitive drum 31; a scorotron charger 33 for generating a corona discharge that charges the surface of the photosensitive drum 31 to a positive polarity; and a developing cartridge 30b including a developer chamber 34, in which toner is stored, a developing roller for supplying toner to the photosensitive drum 31, and a supply roller 36 for supplying toner to the developing roller 35. In the developer chamber 34, an agitator 34a is provided to stir and mix the toner.

The photosensitive member cartridge 30a and the developing cartridge 30b can be separated; however, when the process cartridge 30 is to be removed from the casing 21 of the multifunction apparatus 20, these two cartridges 30a and 30b are removed together as a single unit. At the front of the casing 21, a front cover 37 is attached and mounted so that its lower end pivots about a rotary shaft 37a. The front cover 37 closes and covers the front face of the casing 21. When the front cover 37 is rotated clockwise in FIG. 3, the front face of the multifunction apparatus 20 is opened and the process cartridge 30 can be detached.

A laser scanner unit 46 is arranged above the process cartridge 30 and includes: a laser generator (not shown) for emitting a laser beam; a rotary polygon mirror (hexahedron mirror) 40; a lens 41; a reflecting mirror 42; a reflecting mirror 43; a lens 44 and a reflecting mirror 45. As shown in FIG. 3, a laser beam L, deflected by the polygon mirror 40 and passes through the lens 41 is reflected by the reflecting mirrors 42 and 43, passes through the lens 44 and is reflected by the reflecting mirror 45 and emitted so it scans the photosensitive drum 31 and forms an electrostatic latent image on the surface of the drum.

A fixing unit 47, for fixing toner to a sheet 2, is located to the rear of the process cartridge 30. The fixing unit 47 includes: a heating roller 48 for thermally melting toner transferred to the sheet 2; a pressure roller 49 located opposite the heating roller 48 for pressing the sheet 3 against the heating roller 48; and paired conveying rollers 50.

As shown in FIG. 3, a curved conveying path 51 is formed to the rear, following the conveying rollers 50. After a sheet 2 has been conveyed from the fixing unit 47 and then conveyed along the conveying path 51, the conveying direction is reversed and the sheet 2 is discharged to the discharge tray 24 by paired discharge rollers 52.

The image reading unit 23 will be briefly described. As shown in FIG. 3, the image reading unit 23 is configured by: an image reader 62, which includes a reading unit 60 for reading a document image and a rectangular document table 61 provided as the top face; and an automatic document feeder (hereinafter referred to as an "ADF") 63 that covers the document table 61. A mounting tray 64 (see FIG. 1), where a document is mounted on the upper face, is provided for the ADF 63 and automatically feeds a mounted document to the document table 61.

Furthermore, as shown in FIG. 1, an operating panel 65, which includes various operating buttons 65a and a liquid crystal display portion 65b, is arranged on one side (the front side face of the multifunction apparatus) of the image reader 62. Using the operating panel 65, a registration, such as a user registration for limiting the number of copies that will be described later, can be entered.

(b) Electric Configuration

Figure 2:
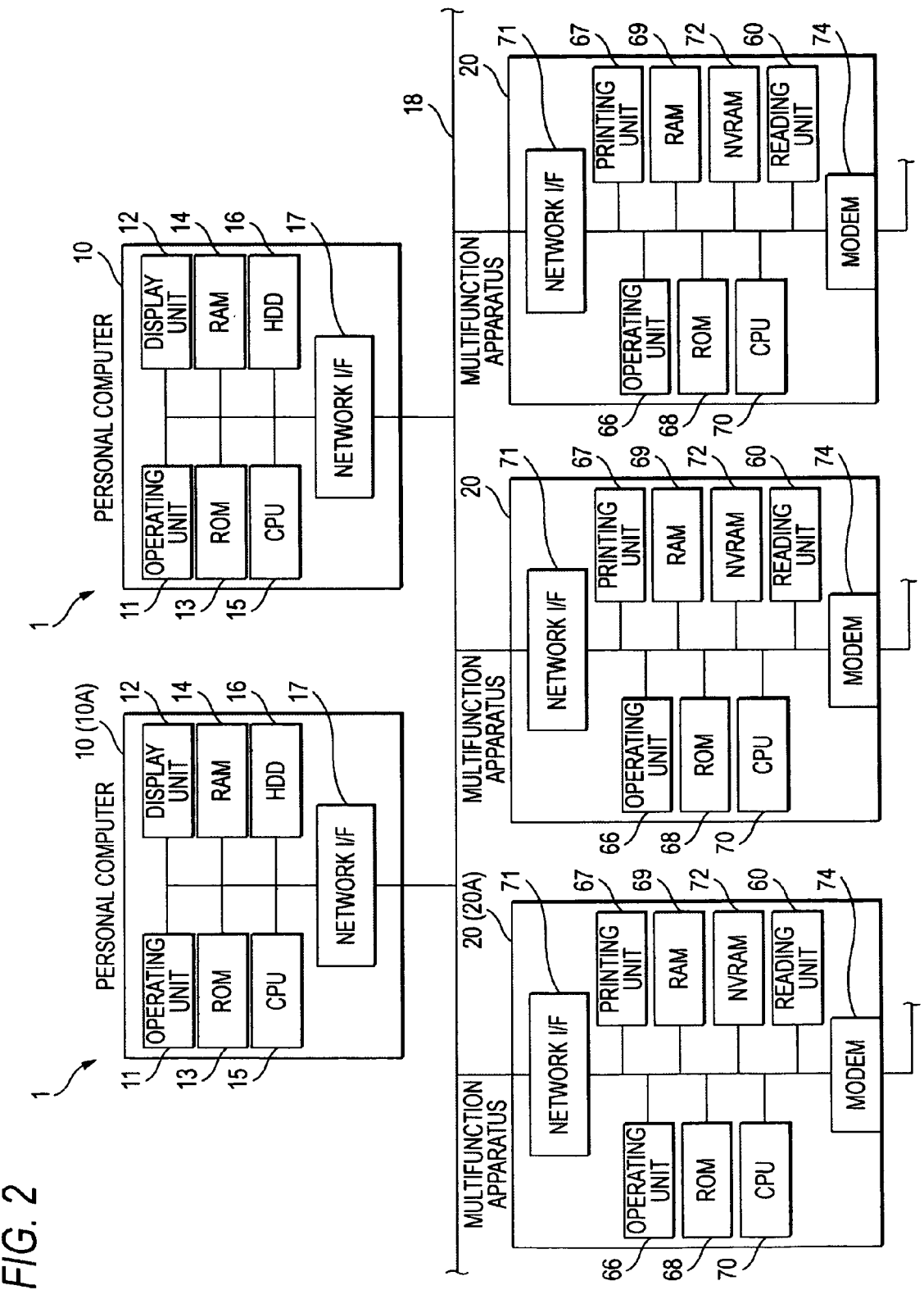
FIG. 2 is a schematic block diagram showing an electric arrangement of the image forming system.

FIG. 2 is a schematic block diagram showing the electric configuration of the image forming system 1 according to the aspect.

The multifunction apparatus 20 includes: a ROM 68; an NVRAM 72 (corresponding to a "storage unit"), which is nonvolatile memory; a RAM 69; a CPU 70; an operating unit 66 (corresponding to an "input unit"), which is available for the performance of various setups; the reading unit 60 for reading an image from a document mounted on the document table 61; a printing unit 67 for controlling a printing operation for the sheet 2; an interface 71; and a modem 74 that can be connected to an analog telephone line.

A program that transmits a reply to an inquiry received from the PC 10, a program that performs a process in accordance with an instruction received from the PC 10, and a program that controls the overall operation of the multifunction apparatus 20 are stored in the ROM 68.

An MIB (Management Information Base), which contains information of the state of the multifunction apparatus 20 to be disclosed externally, is stored in the NVRAM 72. The MIB includes a print information database (hereinafter referred to as a "print information DB"), which is an information database for managing the number of sheets printed by individual users.

Figures 4, 5:
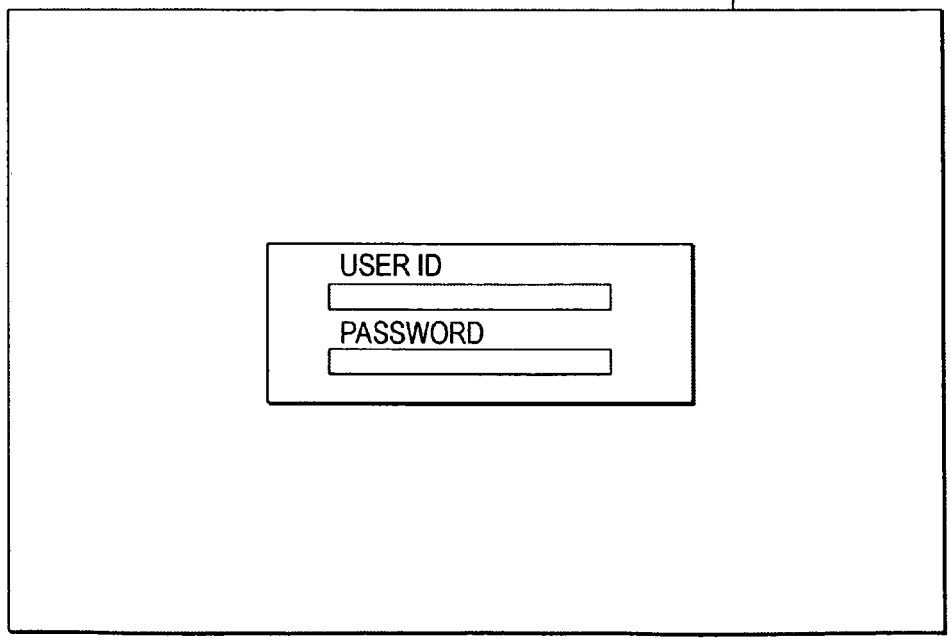
FIG. 4 is a conceptual diagram showing information stored in a print information DB.
FIG. 5 is a diagram showing a screen for requesting an entry of a user ID and a password.

As shown in FIG. 4, a user ID uniquely provided for each user, the number of sheets printed (a print count), which has previously been stored in association with the user ID, and a limitation imposed on the number of sheets that may be printed (the available print count; corresponding to "limitation information") are stored in the print information DB. Specifically, for example, the printing of 100 sheets is permitted for a user having ID 1 in FIG. 4, and since seven sheets have already been printed, this user cannot print more than 93 sheets. A user can designate this limit of print count.

Furthermore, the maximum number to be designated by each user (the maximum print count; corresponding to the "maximum value of limitation information") is stored (set) in the print information DB (500 sheets in FIG. 4). The maximum number to be designated is the maximum value for the limit of print count that the user can designate, and a value (for the number of sheets) greater than the maximum number that is designated cannot be selected (selection is prohibited) as the limit of print count.

When the power for the multifunction apparatus 20 is on, the print information DB of the MIB stored in the NVRAM 72 is expanded in the RAM 69, and the CPU 70 reads from the print information DB in the RAM 69, the limit of print count (limitation information) for each user, and performs the processing in accordance with the limit of print count.

The operating unit 66 includes the operating panel 65, and when the user presses (manipulates) an operating button 65a on the operating panel 65, in accordance with the contents displayed on the liquid display portion 65b of the operating panel 65, the user can enter various registrations (setups), such as a user registration for limiting the number of sheets printed by an individual user.

Specifically, for user registration, when the user manipulates a setup menu button before printing, a screen for requesting the entry of a user ID and a password is displayed on the liquid crystal display portion 65b. In accordance with instructions provided on the screen, the user can manipulate an operating button 65a and enter a user ID and a password. When the entered password matches a password stored in the NVRAM 72 in advance, the user registration is performed, and the user ID is added to the print information DB in FIG. 4.

When the user ID has been registered, a screen for requesting the entry of the limit of print count is displayed on the liquid crystal display portion 65b. Thereafter, the user manipulates an operating button 65a and designates (enters) a limit of print count (the printed count available). When the limit of print count has been designated (entered), and when this value is equal to or smaller than the maximum count that can be designated (the maximum print count) the set (entered) values, such as the user ID, the print count (0 sheets) and the limit of print count are stored (additionally stored) in the print information DB, in association with each other. When the limit of print count that is entered exceeds the maximum count to be designated (in FIG. 4, this is equal to or greater than 501), instead of the limit of print count that has been entered, the maximum number to be designated is automatically designated (stored) as the limit of print count.

When the user ID that has already been registered (is already stored in the print information DB in FIG. 4) is entered, addition of a user ID is not performed, and a screen for requesting the entry of the limit of print count is displayed on the liquid crystal portion 65b, so that the limit of print count stored in the print information DB can be changed (designated).

Then, when the CPU 70 receives from the PC 10, a request for information related to a printing limitation, such as the limit of print count, or limitation information and a user ID (user identification information), the CPU 70 reads, from the print information DB, the limit of print count (limitation information) for the pertinent user ID. And when the printed sheet count has not reached the limit of print count, the CPU 70 transmits usage allowance information to the PC 10 employed by the pertinent user. Thus, when the number of printed sheets has reached the limit of print count, the CPU 70 transmits usage limitation information (e.g., "UNKNOWN") to the PC 10 (10A).

Furthermore, based on a program stored in the ROM 68, the CPU 70 performs printer language processing (PDL processing) for PDL data received from the PC 10 via the interface 71, and transmits the obtained data to the printing unit 67. The printing unit 67 employs the received data to initiate a printing operation for printing the above described print data on the sheet 2.

When the number of printed sheets reaches the limit of print count, the process for transmitting PDL data to the printing unit 67 is halted. Thus, printing performed by the printing unit 67 is halted. The CPU 70 also transmits, to the PC 10, a warning indicating that the number of printed sheets has reached the limit of print count.

(2) Personal Computer

Since the same configuration is employed for all the PCs 10, an explanation will be given for only one of the PCs 10 (10A). The PC 10 includes: an operating unit 11, with which an input operation is enabled; a display unit 12 having a display portion; a ROM 13; a RAM 14; a CPU 15; a hard disk (HDD) 16; and an interface 17.

The operating unit 11 includes input devices, such as a keyboard and a mouse.

When the PC 10 is powered on, as shown in FIG. 5, a screen for requesting the entry of a user ID and a password is displayed on the display unit 12, and a user employs the operating unit 11 to enter a user ID and a password that were allocated for the user. Thereafter, when the CPU 15 determines that the user ID and the password match those registered in advance in the memory of the PC 10, the user is authenticated and is permitted to log in at the PC 10.

Application software for preparing information to be printed, management software (a printing management tool) for managing the usage (the printing) of the multifunction apparatus 20 and a printer driver are stored on the hard disk 16 (corresponds to a "management software storage unit").

The management software is employed to limit the number of sheets that may be printed for each user by the multifunction apparatus 20. Using the management software, the CPU 51 transmits to the multifunction apparatus 20 a signal requesting limitation information, which will be described later.

Based on a start instruction entered at the operating unit 11, the CPU 15 reads from the hard disk 16 the application software and the management software (printing management software (a printing management tool)) or reads the printer driver and activates it.

Figure 6:
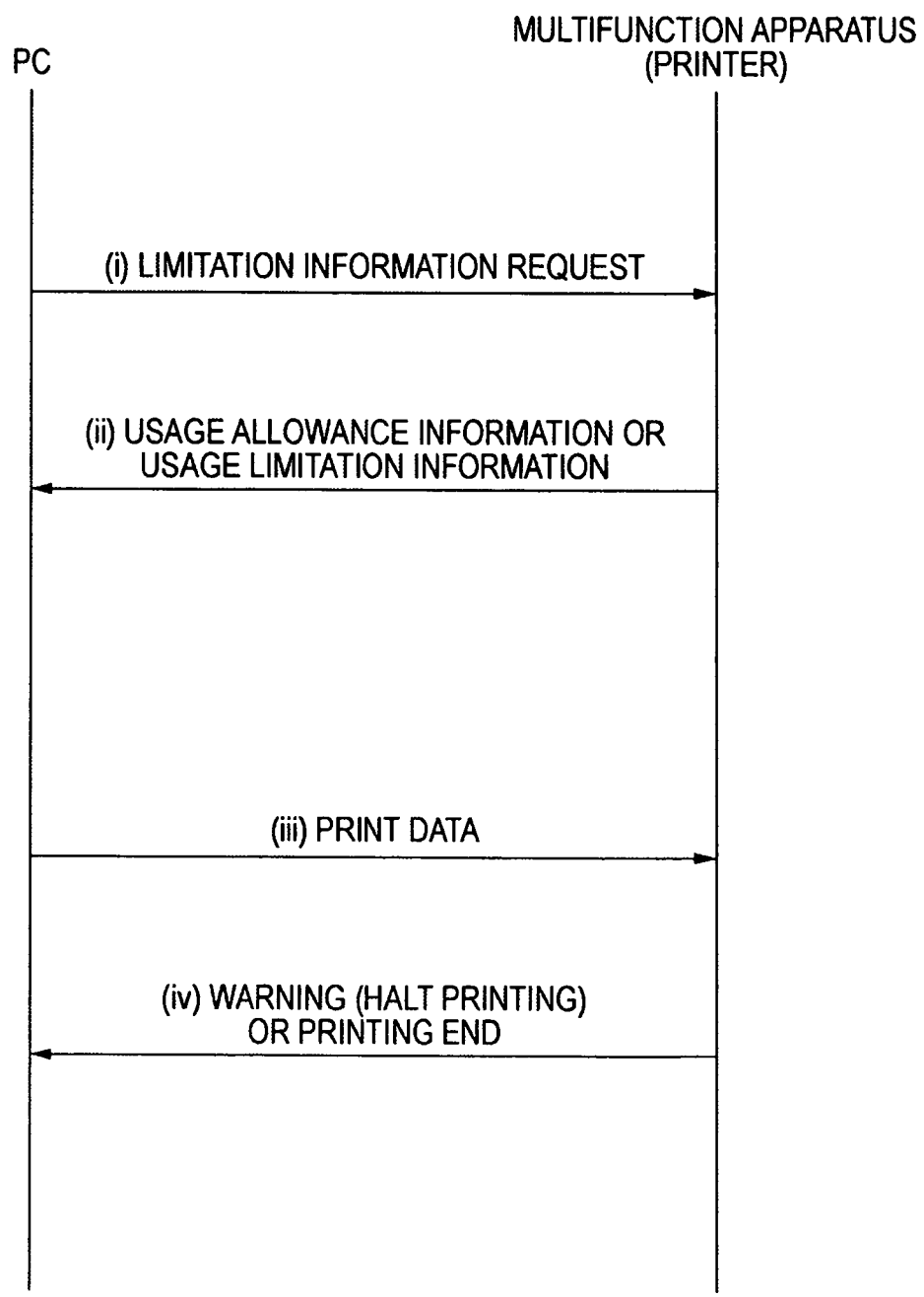
FIG. 6 is a diagram showing transmission/reception of information performed between the personal computer and the multifunction apparatus.

Thus, when user authentication has been performed upon activation of the PC 10 (when the user logged in), as shown in FIG. 6, the CPU 15 transmits a signal requesting the limit of print count (limitation information) for the pertinent user that is stored on the print information DB of the multifunction apparatus 20, i.e., transmits inquiry information concerning a printing limitation established by the user (FIG. 6(*i*)).

When the CPU 15 receives usage allowance information from the multifunction apparatus 20 in response to the signal requesting the limit of print count (the limitation information), the CPU 15 sets the printing enabled state for the multifunction apparatus 20, i.e., sets up the multifunction apparatus 20 so it is available for printing. When the CPU 15 receives usage limitation information such as "UNKNOWN", the CPU 15 sets a printing disabled state for the multifunction apparatus 20, i.e., sets up the multifunction apparatus 20 so it is not available for printing (FIG. 6(*ii*)).

Figure 7:
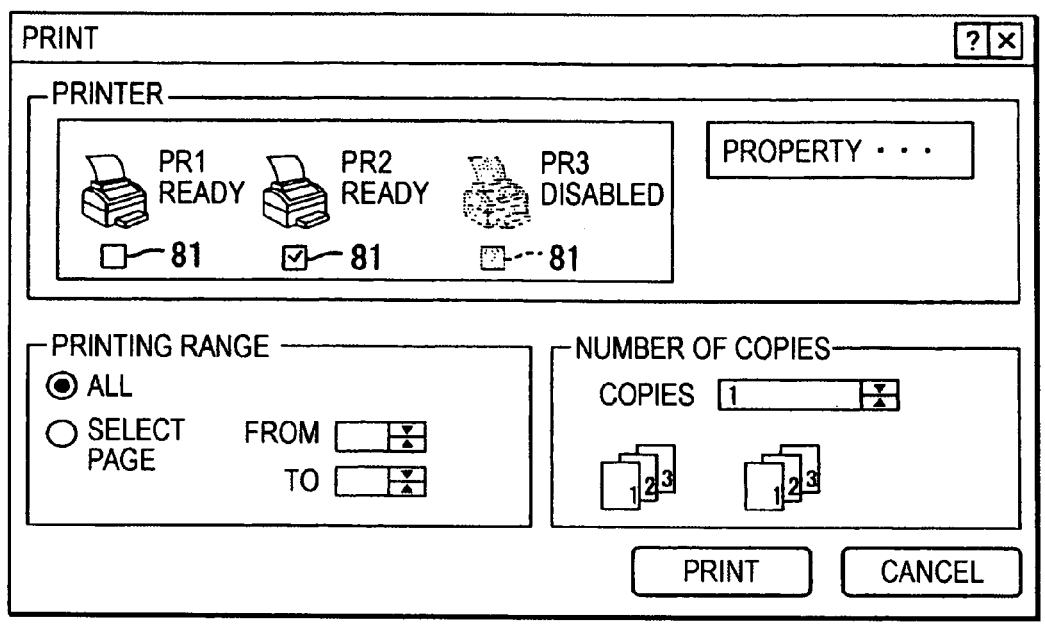
FIG. 7 is a diagram showing a printing setup screen.

For printing, as shown in FIG. 7, a user selects, on a print setup screen (a designation screen), a multifunction apparatus (a printer) to be employed (selected to perform image forming), e.g., a user clicks on a check box 81 for a desired printer (a multifunction apparatus). In this case, a multifunction apparatus of which the number of printed sheets has already reached a predesignated limited count (a multifunction apparatus from which usage limitation information has been transmitted) is not selectable. In this example, a printer PR3 in FIG. 7 is displayed for which a different appearance is employed, is used to indicate the printer PR3 cannot be selected. That is, there is no response when the check box 81 for the printer PR3 is clicked on.

When the user has manipulated the operating unit 11 and the CPU 15 has received a print request instruction, print data prepared by the application software is transmitted to the printer driver. Then, the print data is expanded (converted) to obtain PDL data for printing, and the PDL data is transmitted via the interface 17 (FIG. 6(*iii*)).

Further, when the print count reaches the limit of print count during the printing of multiple sheets, the PC 10 (10A) receives a warning from the multifunction apparatus 20. Or, when printing is completed before the print count reaches the limit of print count, the PC 10 receives a print end notification from the multifunction apparatus 20 (FIG. 6(*iv*)). When the PC 10 receives a warning, this warning is displayed on the display unit 12 (see FIG. 8).

2. Processing Performed by the PC and the Multifunction Apparatus (the Printer) for Printing Management (1) Processing Performed by the PC <Processing Performed by the CPU when Power is Turned on>

Figure 9:
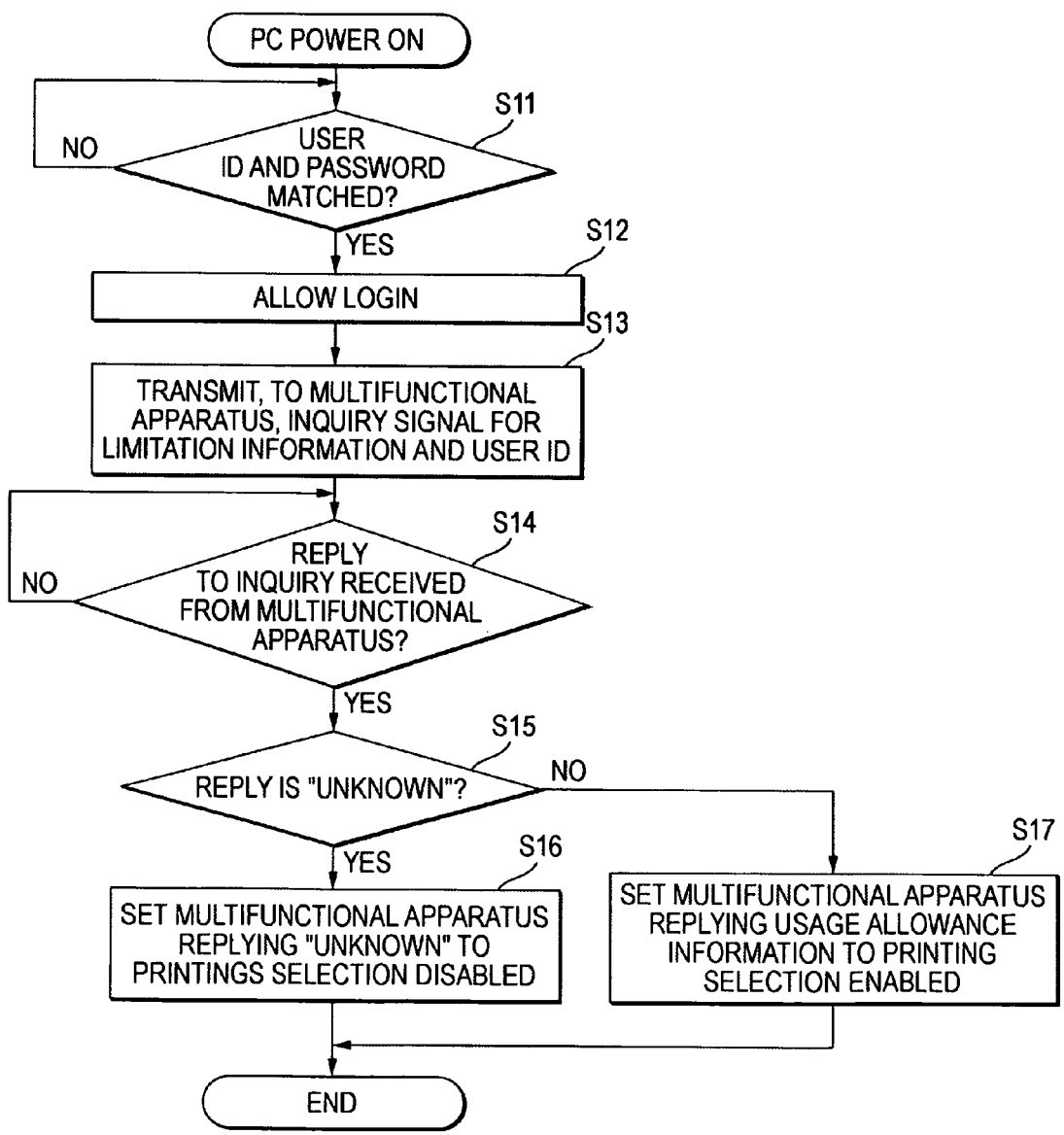

The processing performed by the CPU 15 when power has been turned on is shown in FIG. 9.

When power of the PC 10 is turned on, and when the CPU 15 detects the entry of a user ID and a password, the CPU 15 determines whether the user ID and the password match those that have been previously registered (S11). When the CPU 15 determines that the entries match a user ID and a password that have previously been registered ("Y" at S11), the CPU 15 verifies the login of the user (authenticates the user) (S12).

When the CPU 15 has verified the login of the user, the CPU 15 transmits to the multifunction apparatuses 20 (to each multifunction apparatus for which a driver has been installed in the PC 10) an inquiry signal (inquiry information) requesting limitation information and information concerning the authenticated user ID (S13).

When the CPU 15 receives a signal from a multifunction apparatus 20 in response to the inquiry signal (receives a reply) ("Y" at S14), the CPU 15 determines whether the received signal is usage limitation information (UNKNOWN) (S15).

When the signal received from the multifunction apparatus 20 is usage limitation information (UNKNOWN) ("Y" at S15), the CPU 15 is set so that usage of the multifunction apparatus 20 for printing is disabled (at S16; corresponding to a "designation limiting unit"). Thus, at the printing setup time, a pertinent multifunction apparatus (printer) 20 cannot be selected (see FIG. 8). Therefore, the CPU 15 serves as a display controller.

When the signal received from the multifunction apparatus 20 is not usage limitation information ("N" at S15) but is usage allowance information, the CPU 15 is set so that selection of the multifunction apparatus 20 for printing is enabled (S17). Thus, at the printing setup time, the pertinent multifunction apparatus (printer) 20 can be selected.

<Normal Processing Performed by the CPU>

Figure 10:
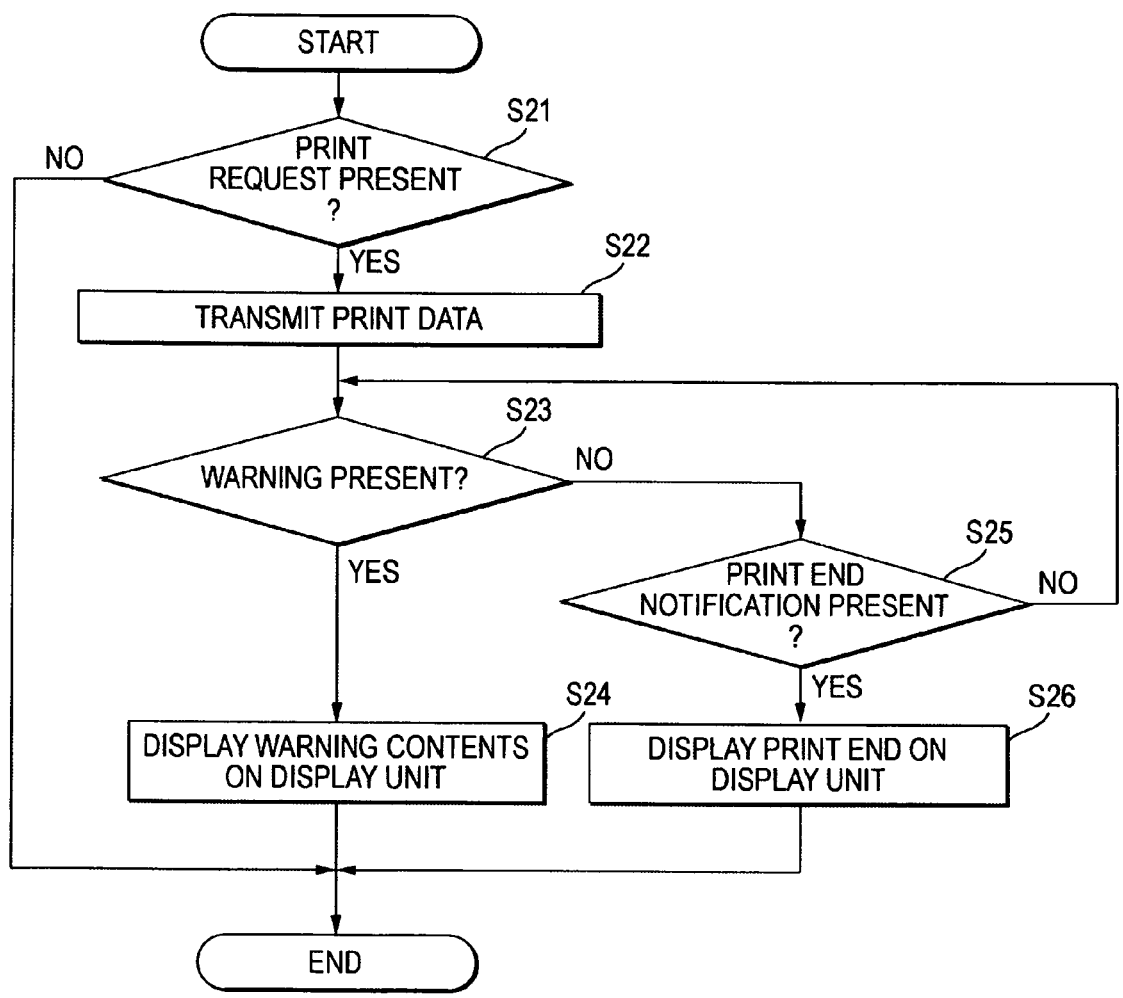
FIG. 10 is a flowchart showing processing performed by the CPU in a normal state.

The normal processing performed by the CPU 15 is shown in FIG. 10.

When the CPU 15 receives a signal from the operating unit 11 and detects the issue of a printing request ("Y" at S21), the CPU 15 transmits print data to a multifunction apparatus 20 that has been designated (selected on the setup screen of the printer driver) (S22). Then, the multifunction apparatus 20 performs printing, and when the printing has been completed, transits a printing end notification to the CPU 15. When the print count reaches the limit of print count during the printing of multiple sheets, the multifunction apparatus 20 transmits a warning to that effect to the CPU 15.

Figure 8:
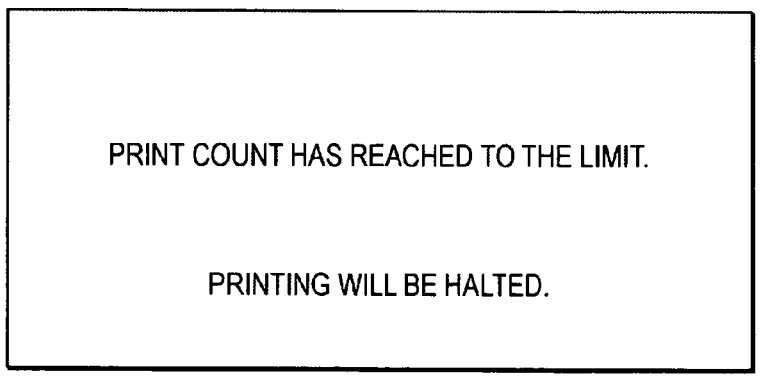
FIG. 8 is a diagram showing a warning displayed when print count has reached to the limit.

When the CPU 15 receives this warning from the multifunction apparatus 20 ("Y" at S23), the CPU 15 displays on the display unit 12 a warning message indicating that the print count has reached the limit of print count (at S24; see FIG. 8). On the other hand, when the CPU 15 receives a print end notification ("Y" at S25), the CPU 15 displays on the display unit 12, a message indicating that printing has been completed (not shown) (S26). Not only a printing ended message but also a remaining sheet count available for printing (the limit of print count minus the number of printed sheets) may be displayed on the display unit 12.

(2) Processing Performed by the Multifunction Apparatus (Printer)

<Processing Performed by the CPU>

Figure 11:
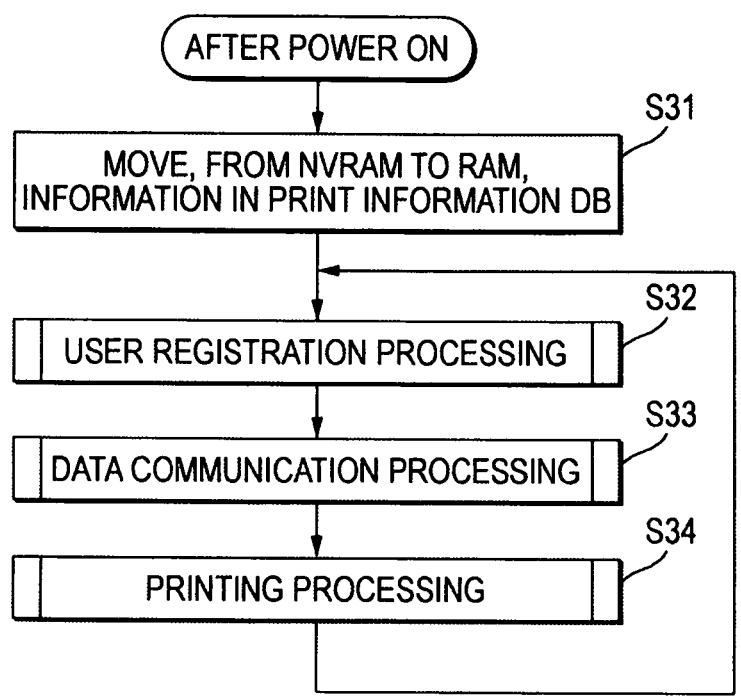

The processing performed by the CPU 70 when power is turned on is shown in FIG. 11.

When power is turned on, the CPU 70 stores, in the RAM 69, print information DB (MIB) stored in the NVRAM 72 (S31).

The CPU 70 sequentially performs the user registration processing (S32), the data communication processing (S33) and the printing processing, and when the printing processing is completed, performs the user registration processing (S32) again, and repeats the same processing (S32 to S34). The user registration processing, the data communication processing and the printing processing will now be described.

<User Registration Processing>

Figure 12:
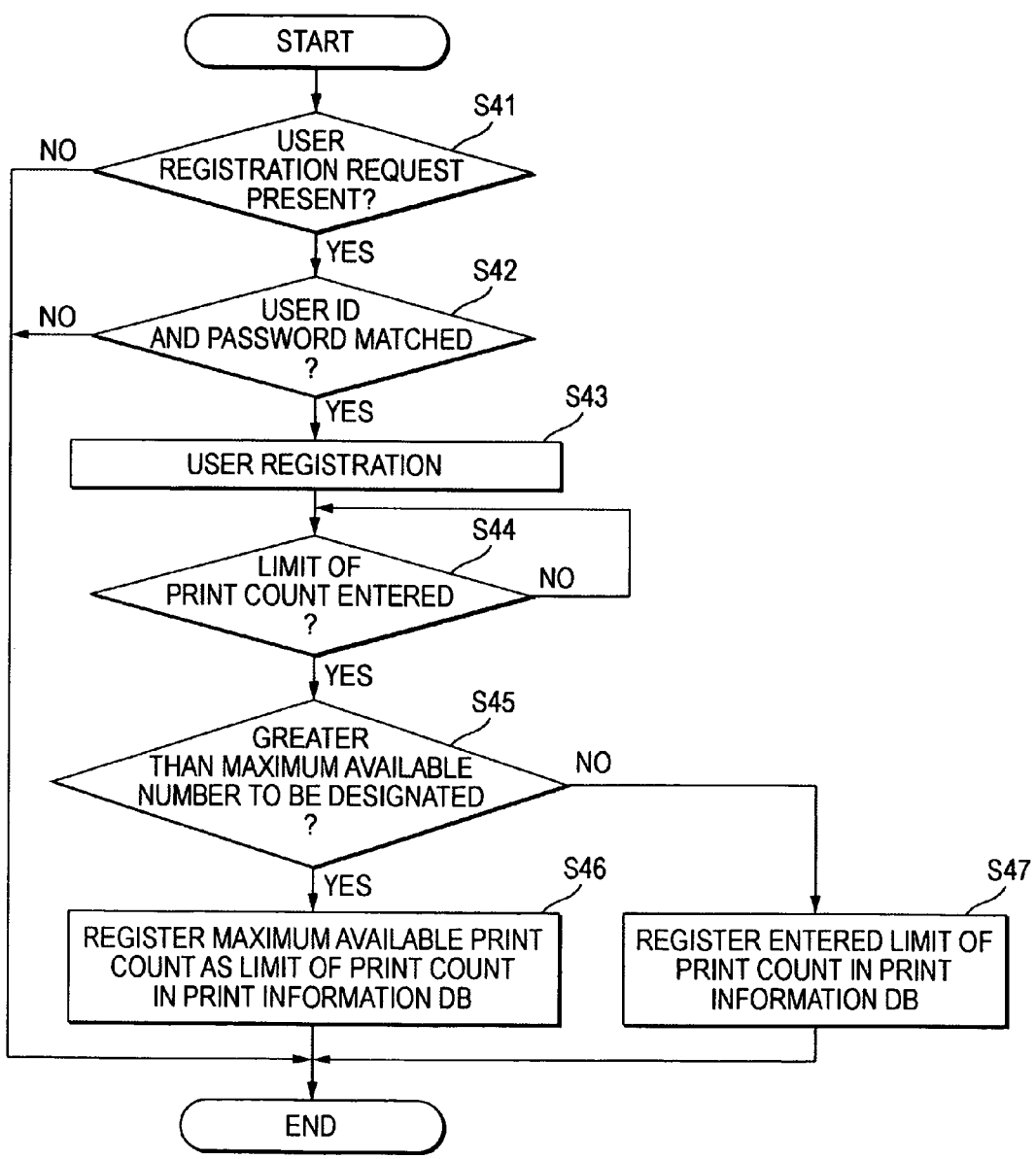
FIG. 12 is a flowchart showing processing performed by the CPU for user registration.

The processing performed by the CPU 70 for user registration is shown in FIG. 12.

When the CPU 70 receives, from the operating unit 66 (or the PC 10), a signal for requesting registration (the rewriting) of limitation information (print information DB) ("Y" at S41), the CPU 70 determines whether a user ID and a password that are entered match those registered in advance (stored in a memory) (S42).

When the user IDs and the passwords match ("Y" at S42), the CPU 70 determines whether the user ID is present in the print information DB, and when the input user ID has not yet been registered, registers this user ID (S43).

Then, the CPU 70 displays a message on the liquid display portion 65*b* to request entry of the limit of print count. When, based on a signal received from the operating unit 66, the CPU 70 detects the limit of print count has been entered ("Y" at S44), the CPU 70 determines whether the limit of print count is greater than the maximum available number to be designated that is stored in the NVRAM 72 in advance (S45).

When the limit of print count that is input is greater than the maximum available number to be designated ("Y" at S45), in the print information DB, the CPU 70 registers the maximum available number to be designated as a new limit of print count, instead of the limit of print count that is input (S46).

When the limit of print count that is input is not greater than (equal to or smaller than) the maximum available number to be designated ("N" at S45), the CPU 70 sets, in the print information DB, the number that has been entered (S47).

The succeeding data communication processing is performed.

When a request for registration of limitation information is not issued ("N" at S41) or when the user IDs and the passwords do not match ("N" at S42), sequentially, the succeeding data communication processing is performed.

<Data Communication Processing>

Figure 13:
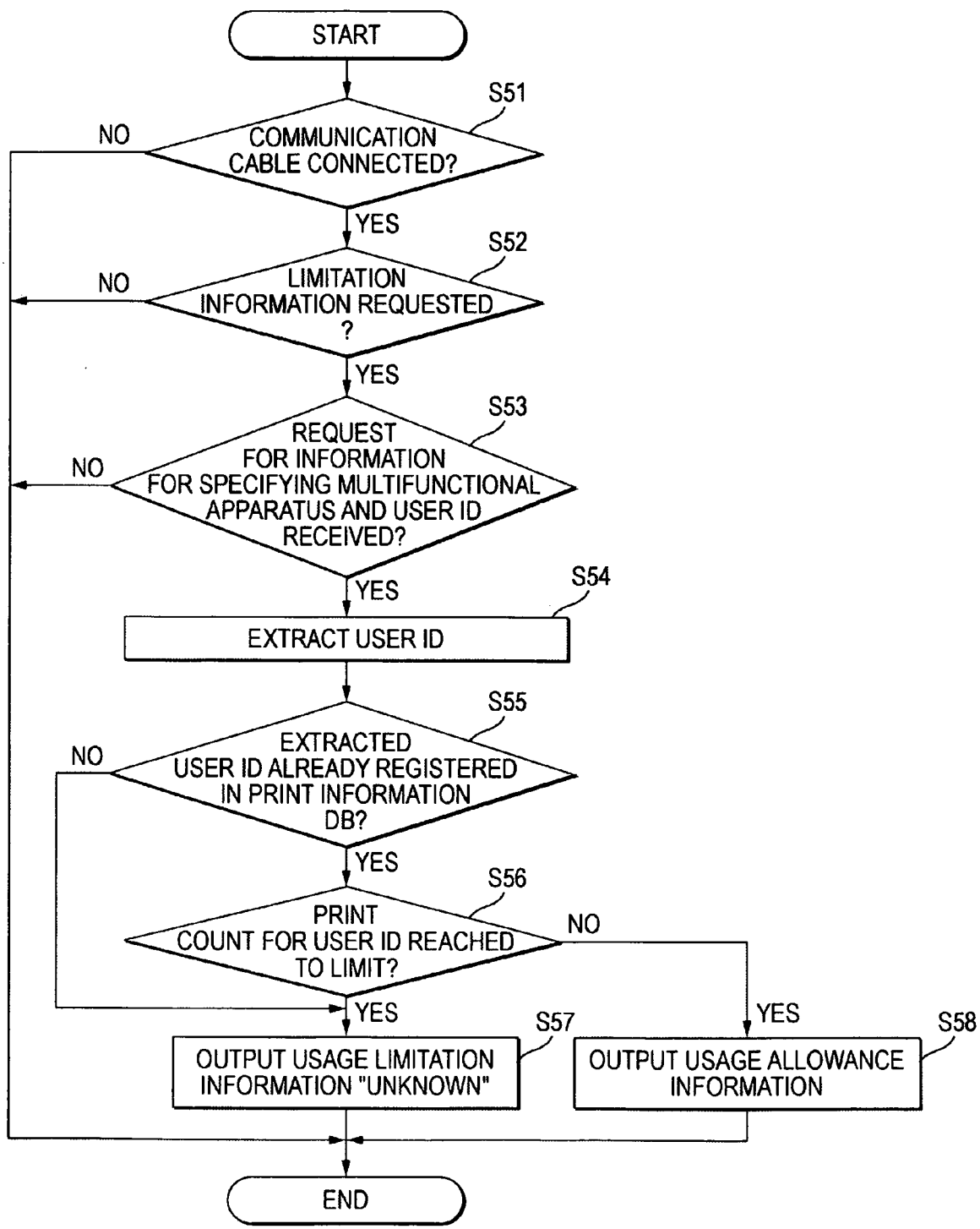
FIG. 13 is a flowchart showing processing performed by the CPU for data communication.

The processing performed by the CPU 70 for data communication is shown in FIG. 13.

When the CPU 70 detects the connection of a communication cable ("Y" at S51), the CPU 70 determines whether the CPU 70 has received a signal that requests information concerning the limit of print count (limitation information) in the print information DB (MIB), i.e., inquiry information concerning a printing limitation for a user (S52).

When the CPU 70 receives a signal that requests the limit of print count (limitation information) ("Y" at S52), the CPU 70 determines whether the CPU 70 has received from the PC 10 a request for information for specifying the multifunction apparatus 20, and a user ID (S53).

When the CPU 70 receives a request, for information for specifying the multifunction apparatus 20, and a user ID ("Y" at S53), the CPU 70 extracts a user ID transmitted by the PC 10 (S54; corresponding to an "extraction unit").

Then, the CPU 70 determines whether the extracted user ID has already been registered in the print information DB (S55).

When the user ID has already been registered in the print information DB ("Y" at S55), the CPU 70 employs the print information DB to determine whether the print count consonant with the user ID has reached the limit of print count (S56; corresponding to a "determination unit").

When the print count has not yet reached the limit of print count (printing is still available) ("N" at S56), the CPU 70 outputs (returns) printing allowance information to the PC 10 employed by the pertinent user (S58).

When the user ID has not yet been registered in the print information DB, or when the print count consonant with the user ID has reached the limit of print count ("N" at S55 or "Y" at S56), the CPU 70 outputs (returns) usage limitation information (information UNKNOWN) to the PC 10 (10A) employed by the pertinent user (S57; corresponding to a "limitation information output unit").

The succeeding printing processing is thereafter performed.

When a communication cable has not been connected ("N" at S51), when a signal for requesting limitation information has not been received ("N" at S52), or when a request for information for specifying the multifunction apparatus 20 and a user ID are not received ("N" at S53), sequentially, the succeeding printing processing is performed.

<Printing Processing>

Figure 14:
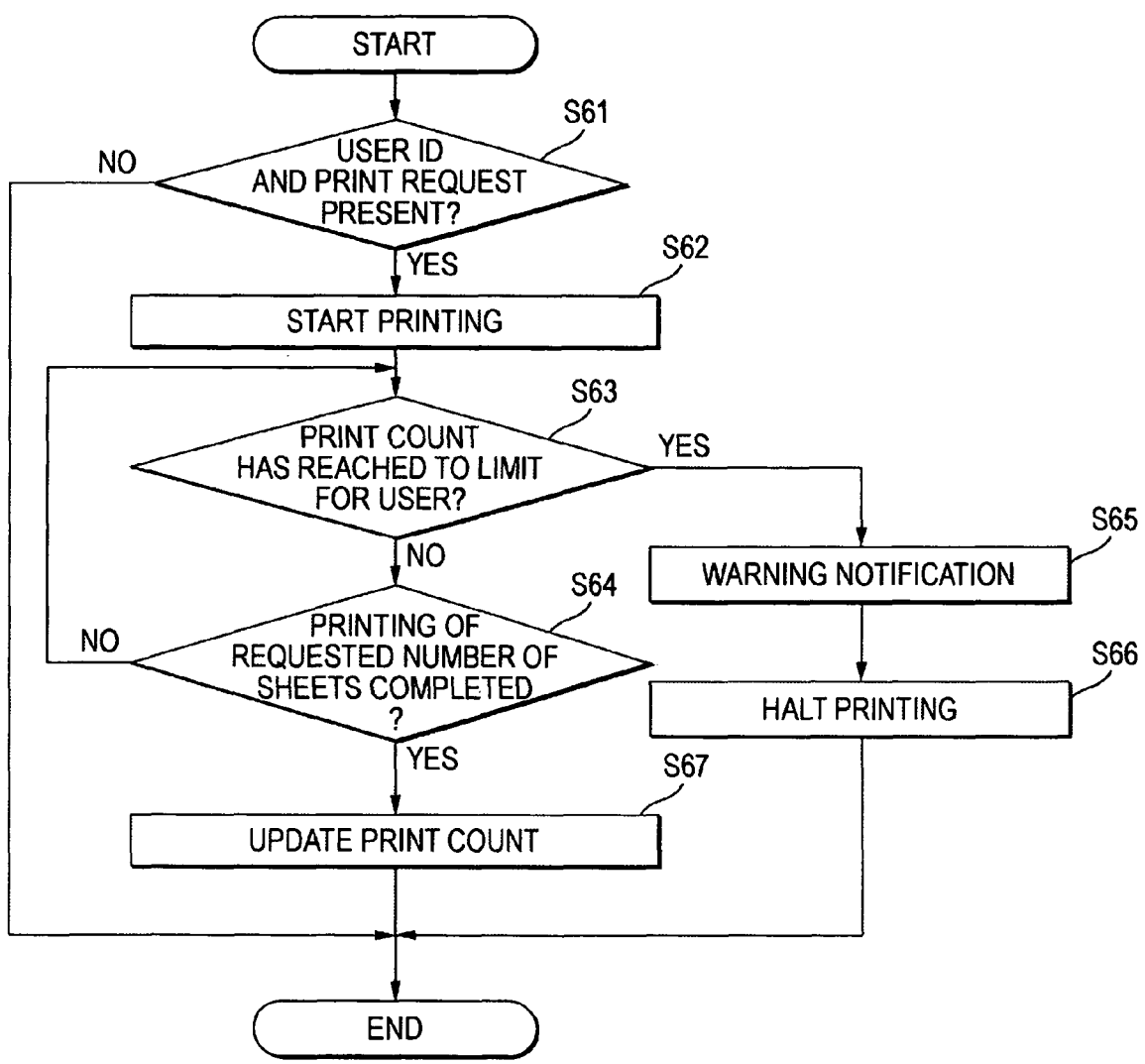
FIG. 14 is a flowchart showing processing performed by the CPU for printing.

The processing performed by the CPU 70 for printing is shown in FIG. 14.

When the CPU 70 receives a printing request and information for a user ID ("Y" at S61), the CPU 70 permits the printing unit 67 to start the printing of print data (S62).

When the print count for the user ID has not reached the limit of print count stored in the print information DB ("N" at S63), the CPU 70 continues printing until the requested printing count reaches the limit of print count ("N" at S64 and "N" at S63).

When, during printing, the print count for the user has reached the limit of print count ("Y" at S63), the CPU 70 outputs a warning signal to the PC 10 employed by the user (S65; corresponding to a "notification unit" according to the invention), and permits the printing unit 67 to halt printing (S66). Thus, since a warning indicating that the print count has reached the limit of print count is displayed on the display unit 12 of the PC 10, the user can be notified of such information. Further, when the print count reaches the limit of print count, printing is halted, so that the performance of printing exceeding the predesignated limited number of sheets can be prevented.

On the other hand, when the requested number of sheets has been printed before the print count reaches the limit of print count, the CPU 70 updates the print count stored in the print information DB (S67).

When the printing is halted (S66) or when the print count is updated (S67), the printing processing is terminated.

It should be noted that when either a printing request or user ID information is not received ("N" at S61), the printing processing is terminated.

Thereafter, the processing (S32 to S34) is repeated beginning with the user registration process (S32) in FIG. 11.

3. Advantages of this Aspect (1) According to this aspect, based on usage limitation information, the PC 10 (10A; image forming apparatus controller) can determine whether the printing limit (image forming) has been applied for a user who has been registered in a multifunction apparatus 20 (20A, image forming apparatus) for which is issued a request (an inquiry) for limitation information (the limit of print count). Furthermore, the pertinent PC 10 (or the user thereof) cannot select the multifunction apparatus 20 for the performance of image forming. Thus, for printing, a print request must be output only to a multifunction apparatus 20 for which printing is available, and unnecessary labor, such as when a print request is output to a multifunction apparatus 20 for which usage is limited (that cannot be selected) can be eliminated.

(2) A user ID (user identification information), which the PC 10 (image forming apparatus controller) transmits with a request for limitation information (the limit of print count), can be employed to determine whether the limited count for printing (image forming) for a user has been applied. Therefore, when multiple users employ a single PC 10, whether the limited count for printing has been applied can be determined for each user.

(3) Since a request (an inquiry) for limitation information (the limit of print count) is issued when a user logs in, it is possible to eliminate unnecessary labor such that, when printing (image forming) is to be performed quickly after a user has logged in, a print request is output to a multifunction apparatus 20 (an image forming apparatus) for which printing is limited.

<Another Aspects>

The present invention is not limited to the above aspect described with reference to the drawings. For example, the following aspects are also included in the technical scope of this invention, and furthermore, the present invention can be variously modified without departing from the scope of the invention.

(1) In the above aspect, a user ID and a password have been stored in the PC 10 employed by a user. However, a server computer for which multiple PCs 10 may be provided, and the server computer may manage a user ID and a password employed in common by these PCs 10.

(2) In the above aspect, different limitation information for individual user IDs has been stored in the print information DB, and the print counts have been managed for the individual users. However, for the individual PCs 10, different limited counts for printing (limitation information) may be stored in the print information DB, and the print counts may be managed for the individual PCs 10. In this case, for the IP addresses or the MAC addresses of individual PCs 10, instead of the user IDs, different limits of print count (limitation information) must be stored in the print information DB.

Further, when the print counts are managed for the individual PCs 10, the entry of user ID is not needed, so that, when a PC 10 is powered on, a request for limitation information (an inquiry for limitations related to image forming) may be issued.

(3) In the above aspect, when the user logs in at a PC 10, a request (inquiry information) for limitation information is transmitted to the multifunction apparatus 20. However, a request (inquiry information) for limitation information may be periodically issued (at a predetermined time interval), or an inquiry may be issued at a predesignated time (a day and time).

(4) Limitation information is not limited to the limit of print count, and when an image forming unit is compatible with color printing, may be another limitation, such as color printing limitation, a color printing limited count, or a limitation for a sheet size (used in common for color and monochrome). Either this or the limitation information may be a limitation, such as a color printing limitation, provided in addition to the limit of print count for each user. Additionally, a limitation may be provided for one of the functions (a facsimile function, a scanner function or a printer function) of a multifunction apparatus, or different limitations may be provided for these functions. Furthermore, a day and time, for example, may be designated as a limitation, e.g., printing cannot be designated for a specific day and time.

(5) In the above aspect, the management software and the printer driver have been separately provided; however, these may be integrally provided.

(6) In the above aspect, the designation of a multifunction apparatus (printer) for which usage is limited is disabled on the printer driver setup screen. However, the arrangement is not limited to this.

Figure 15:
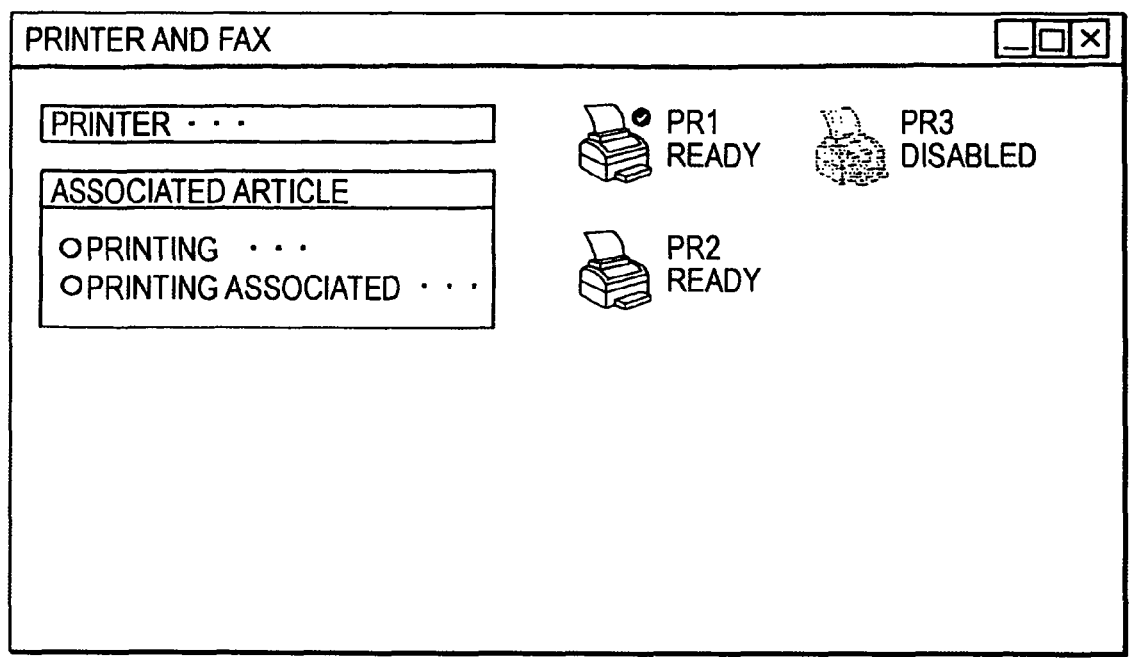
FIG. 15 is a diagram showing a printing setup screen according to another aspect of the present invention.

As another example arrangement, in FIG. 15, a designation (selection) of a multifunction apparatus (printer) is disabled on the OS (Operating System) setup screen.

What is claimed is:

1. An image forming apparatus controller, which is connected via a network to an image forming apparatus, the image forming apparatus controller comprising:
    a display unit;
    a management software storage unit for storing management software that manages the image forming apparatus;
    a display controller for displaying on the display unit, a designation screen, for selection of an image forming apparatus that performs image forming, correspondingly with the management software;
    a transmission unit for transmitting, to the image forming apparatus, an inquiry concerning limitation information and a user identification information for identifying a user when the user is logged in at the image forming apparatus controller; and
    a designation limiting unit that, when usage limitation information is received from the image forming apparatus in response to the inquiry, limits designation of the image forming apparatus on the designation screen for the user, wherein
    the designation screen is configured to:
        display the image forming apparatus to be selectable when the designation limiting unit has not received the usage limitation information from the image forming apparatus, and
        display the image forming apparatus to be non-selectable when the designation limiting unit has received the usage limitation information from the image forming apparatus.

2. The image forming apparatus controller according to claim 1, further comprising:
    a notification receiving unit, wherein:
        the transmission unit further transmits an image forming request to the image forming apparatus selected through the designation screen, and
        after the transmission unit transmits the image forming request, when the notification receiving unit receives notification indicating that the limitation has been applied, the display controller displays a screen based on the notification received by the notification receiving unit.

3. The image forming apparatus controller according to claim 1,
    wherein the transmission unit transmits an image forming request and the user identification information again, in order to request the image forming apparatus to form an image, after transmitting the inquiry and the user identification information.

4. An image forming system comprising:
    an image forming apparatus capable of performing image forming; and
    an image forming apparatus controller, which is connected to the image forming apparatus via a network and which issues an image forming request to the image forming apparatus,
    wherein the image forming apparatus comprises:
        a storage unit used for storing, in association with a user, limitation information that limits image forming;
        a determination unit that, when inquiry information concerning the limitation information and user identification information for identifying a user is received from the image forming apparatus controller, employs contents stored in the storage unit to determine whether a limitation indicated in the limitation information associated with the user identified by the user identification information has been applied; and
        a limitation information output unit that, when the determination unit determines that the limitation indicated in the limitation information has been applied, outputs to the image forming apparatus controller, usage limitation information that limits usage of the image forming apparatus,
    wherein the image forming apparatus controller comprises:
        a transmission unit for transmitting to the image forming apparatus, the inquiry concerning the limitation information and the user identification information when the user is logged in at the image forming apparatus controller;
        a display unit;
        a management software storage unit for storing management software that manages the image forming apparatus;
        a display controller for displaying on the display unit, a designation screen, for selecting an image forming apparatus that performs image forming, correspondingly with the management software; and
        a designation limiting unit that, when the usage limitation information is received from the image forming apparatus in response to the inquiry, limits designation of the image forming apparatus on the designation screen for the user, wherein
        the designation screen is configured to:
            display the image forming apparatus to be selectable when the designation limiting unit has not received the usage limitation information from the image forming apparatus, and
            display the image forming apparatus to be non-selectable when the designation limiting unit has received the usage limitation information from the image forming apparatus.

5. The image forming system according to claim 4, wherein:
    the transmission unit further transmits an image forming request to the image forming apparatus selected through the designation screen with the user identification information, separately from the transmission of the inquiry and the user identification information, when the user is logged in at the image forming apparatus controller, the image forming apparatus starts image forming in response to receiving the image forming request, and the image forming apparatus stops the image forming when the limitation information associated with the user identified by the user identification information transmitted with the image forming request is satisfied during the image forming.

6. The image forming system according to claim 5, wherein:

the image forming apparatus transmits notification indicating that the limitation information is applied to the image forming apparatus when the limitation information associated with the user identified by the user identification information transmitted with the image forming request is satisfied during the image forming, and the display controller displays a screen indicating that the image forming is stopped by the limitation information being applied.

\* \* \* \* \*